US012534881B2

(12) United States Patent
Hatta

(10) Patent No.: US 12,534,881 B2
(45) Date of Patent: Jan. 27, 2026

(54) CYLINDER COVER, HYDRAULIC CYLINDER, AND WORKING MACHINE

(71) Applicant: KUBOTA CORPORATION, Osaka (JP)

(72) Inventor: Kazuyuki Hatta, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/975,185

(22) Filed: Dec. 10, 2024

(65) Prior Publication Data

US 2025/0101998 A1 Mar. 27, 2025

Related U.S. Application Data

(63) Continuation of application No. PCT/JP2023/023886, filed on Jun. 28, 2023.

(30) Foreign Application Priority Data

Jun. 30, 2022 (JP) ................................ 2022-105782

(51) Int. Cl.
*E02F 9/22* (2006.01)
*F15B 15/14* (2006.01)

(52) U.S. Cl.
CPC ........ *E02F 9/2271* (2013.01); *F15B 15/1423* (2013.01); *F15B 15/1428* (2013.01); *F15B 15/1457* (2013.01); *F15B 15/1471* (2013.01)

(58) Field of Classification Search
CPC .............. F15B 15/1428; F15B 15/1457; F15B 15/1471; E02F 3/38; E02F 9/0808; E02F 9/0858; E02F 9/2271
See application file for complete search history.

(56) References Cited

U.S. PATENT DOCUMENTS 2,764,303 A * 9/1956 Austin, Sr. ................ E02F 3/36 414/685
5,292,079 A * 3/1994 Zakohji ................... E02F 3/965 241/101.73

(Continued)

FOREIGN PATENT DOCUMENTS

JP H03-103352 U1 10/1991
JP H08296611 A * 11/1996 ............ E02F 9/2271

(Continued)

OTHER PUBLICATIONS

International Search Report with Written Opinion, dated Aug. 22, 2023, issued in International Bureau of WIPO Patent Application No. PCT/JP2023/023886 with English translations thereof.

*Primary Examiner* — Michael Leslie
(74) *Attorney, Agent, or Firm* — GREENBLUM & BERNSTEIN, P.L.C.

(57) ABSTRACT

A cylinder cover includes a body and a guide portion. The body is attached to a cylinder rod movable according to telescopic movement of a hydraulic cylinder. The body supported by the guide portion is slidable along the cylinder rod. The guide portion includes a guide plate provided on an outer circumference of a cylinder tube of the hydraulic cylinder to extend in a direction of tangent to an outer circumference of the cylinder tube, and a pair of end portions of the guide plate in the direction of tangent. The body includes first portions facing side surfaces of the end portions opposite to the cylinder tube, second portions facing end surfaces of the end portions in the direction of tangent, and third positions facing second side surfaces of the end portions close to the cylinder tube. The end portions each include a curved convex bulging toward the second portion.

11 Claims, 10 Drawing Sheets

(56) References Cited

U.S. PATENT DOCUMENTS

| | | | | |
|---|---|---|---|---|
| 7,008,169 | B1 * | 3/2006 | Miyanishi | E02F 3/38 414/722 |
| 7,165,487 | B2 * | 1/2007 | Kim | F15B 15/1471 92/161 |
| 7,958,980 | B2 * | 6/2011 | Seino | E02F 9/24 74/615 |
| 10,392,783 | B2 * | 8/2019 | Nishide | F15B 15/1423 |
| 10,415,608 | B2 * | 9/2019 | Van Gemert | F15B 15/1423 |
| 12,025,160 | B2 * | 7/2024 | Ray | F15B 15/20 |
| 2021/0270003 | A1 * | 9/2021 | Horii | E02F 3/964 |

FOREIGN PATENT DOCUMENTS

| | | | | | |
|---|---|---|---|---|---|
| JP | H10292426 | A | * | 11/1998 | E02F 9/2271 |
| JP | 2001-73405 | A | | 3/2001 | |
| JP | 2001073404 | A | * | 3/2001 | |
| JP | 2002-220853 | A | | 8/2002 | |
| JP | 2005256354 | A | * | 9/2005 | H03F 1/3235 |
| JP | 3718434 | B2 | * | 11/2005 | E02F 9/2271 |
| JP | 2008-95297 | A | | 4/2008 | |
| JP | 4908141 | B2 | * | 4/2012 | |
| JP | 2020-101058 | A | | 7/2020 | |
| KR | 20150114706 | A | * | 10/2015 | E02F 9/14 |

* cited by examiner

CYLINDER COVER, HYDRAULIC CYLINDER, AND WORKING MACHINE

CROSS REFERENCE TO RELATED APPLICATIONS

This application is a continuation application of International Application No. PCT/JP2023/023886, filed on Jun. 28, 2023, which claims the benefit of priority to Japanese Patent Application No. 2022-105782, filed on Jun. 30, 2022. The entire contents of each of these applications are hereby incorporated herein by reference.

BACKGROUND OF THE INVENTION

1. Field of the Invention

The present invention relates to a cylinder cover, a hydraulic cylinder, and a working machine including the cylinder cover and the hydraulic cylinder.

2. Description of the Related Art

Conventionally, a cover member disclosed in Japanese Unexamined Patent Application Publication No. 2020-101058 is known as a cylinder cover mounted on a hydraulic cylinder of a working machine such as a backhoe.

The cover member disclosed in Japanese Unexamined Patent Application Publication No. 2020-101058 includes an attachment plate fixed to a cylinder tube of a working tool cylinder, a pair of guide members mounted so as to cover attachment portions protruding leftward and rightward from the attachment plate, a pair of slide members extending in the same direction as an extension direction of the cylinder tube, a support body that supports the slide members, and an attachment body that is coupled to a piston rod of the working tool cylinder and holds the support body. The guide members provided on left and right end portions of the attachment plate are fitted into inner grooves of the slide members. The attachment plate is thus slidably coupled to the attachment body.

However, according to this kind of cylinder cover, in a case where a direction in which the hydraulic cylinder telescopically moves and a direction in which the slide members (groove portions) extend are deviated due to variations in accuracy of assembling with the hydraulic cylinder, aging distortion, or the like, sliding resistance increases since end surfaces of the guide members make contact with inner groove portions of the slide members. This may undesirably invite occurrence of abnormal sound and defective operation during working. On the other hand, if a gap between the guide members and the slide members is increased to avoid the contact, another problem that vibration of the cylinder cover increases arises. Furthermore, a foreign substance may enter inner sides of the slide members through the gap. This may invite defective operation.

The present invention was attained to solve the above problems, and an object of the present invention is to provide a cylinder cover and a hydraulic cylinder that can smoothly operate while preventing or reducing occurrence of abnormal sound or vibration, and a working machine including the cylinder cover and the hydraulic cylinder.

SUMMARY OF THE INVENTION

A cylinder cover according to an example embodiment of the present invention is mounted on a hydraulic cylinder and protects a cylinder rod of the hydraulic cylinder. The cylinder cover includes: a cover body that includes a first end attached to a head side portion of the cylinder rod and moves together with the cylinder rod according to a telescopic movement of the hydraulic cylinder; and a guide portion to support the cover body such that the cover body is slidable along an extension direction of the cylinder rod. The guide portion includes: a guide plate that is provided on an outer circumferential portion of a cylinder tube of the hydraulic cylinder so as to extend in a direction of tangent to an outer circumference of a cross section of the cylinder tube that is perpendicular to an extension direction of the cylinder tube; and a pair of end portions that are provided on both end portions of the guide plate in the direction of tangent. The cover body includes: first portions that face first side surfaces of the end portions that are located opposite to the cylinder tube; second portions that face end surfaces of the end portions in the direction of tangent; and third portions that face second side surfaces of the end portions that are close to the cylinder tube. Each of the end portions includes, on the end surface thereof, a first curved convex surface portion curved such as to bulge toward the second portion.

The first curved convex surface portion may have an arc shape when viewed from a direction normal to a plate surface of the guide plate.

The first curved convex surface portion may have an arc shape that defines a part of a circle having a diameter smaller than a circle whose diameter is a width by which the second portions provided on both sides of the cover body in the direction of tangent are separated.

The first curved convex surface portions of the end portions provided on both sides in the direction of tangent may have concentric arc shapes.

Each of the end surfaces may have, on both sides of the first curved convex surface portion in the extension direction of the cylinder rod, an inclined surface portion inclined farther away from the second portion as a distance from the first curved convex surface portion increases in the extension direction of the cylinder rod.

A cross section of each of the end surfaces that is perpendicular to the extension direction of the cylinder rod may have a shape curved such as to bulge toward the second portion or a corner portion of each of the end surfaces that is located opposite to the cylinder tube and a corner portion of each of the end surfaces that is close to the cylinder tube on the cross section perpendicular to the extension direction of the cylinder rod may be chamfered.

Each of the end portions may have, on at least of the first side surface and the second side surface, a second curved convex surface portion curved such as to bulge in a direction normal to a plate surface of the guide plate.

A cross section of the second curved convex surface portion that is perpendicular to the extension direction of the cylinder rod may have an arc shape.

The end portions may be made of a resin member.

The cylinder cover is mounted on a hydraulic cylinder according to an example embodiment of the present invention.

A working machine according to an example embodiment of the present invention includes a machine body; and a working device mounted on the machine body, and the working device includes the hydraulic cylinder.

The working device may include a cylinder bracket that supports a first end portion on a head side portion of the cylinder rod. The cylinder bracket may include a pair of bracket side plates that stand away from each other in one direction and sandwich the first end portion and a cover plate that covers a separation space between the bracket side plates. Each of the bracket side plates may have a thinned portion. The cover plate may include lid pieces that cover the respective thinned portions.

The lid pieces may be formed by bending portions of the cover plate.

The first end of the cylinder cover may be attached to the head side portion of the cylinder rod from a first direction with use of a bolt. The cover plate may be provided at a position that does not overlap an attachment portion of the bolt when viewed from the first direction.

The thinned portion may be a cutout formed in a head edge portion of each of the bracket side plates.

A working machine according to an example embodiment of the present invention includes a machine body; and a working device mounted on the machine body. The working device includes a hydraulic cylinder that drives the working device and a cylinder bracket that supports a first end portion of the hydraulic cylinder. The cylinder bracket includes a pair of bracket side plates that stand away from each other in one direction and sandwich the first end portion and a cover plate that covers a separation space between the bracket side plates. Each of the bracket side plates includes a thinned portion. The cover plate includes lid pieces that cover the respective thinned portions.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

DETAILED DESCRIPTION OF THE EXAMPLE EMBODIMENTS

Figure 1:
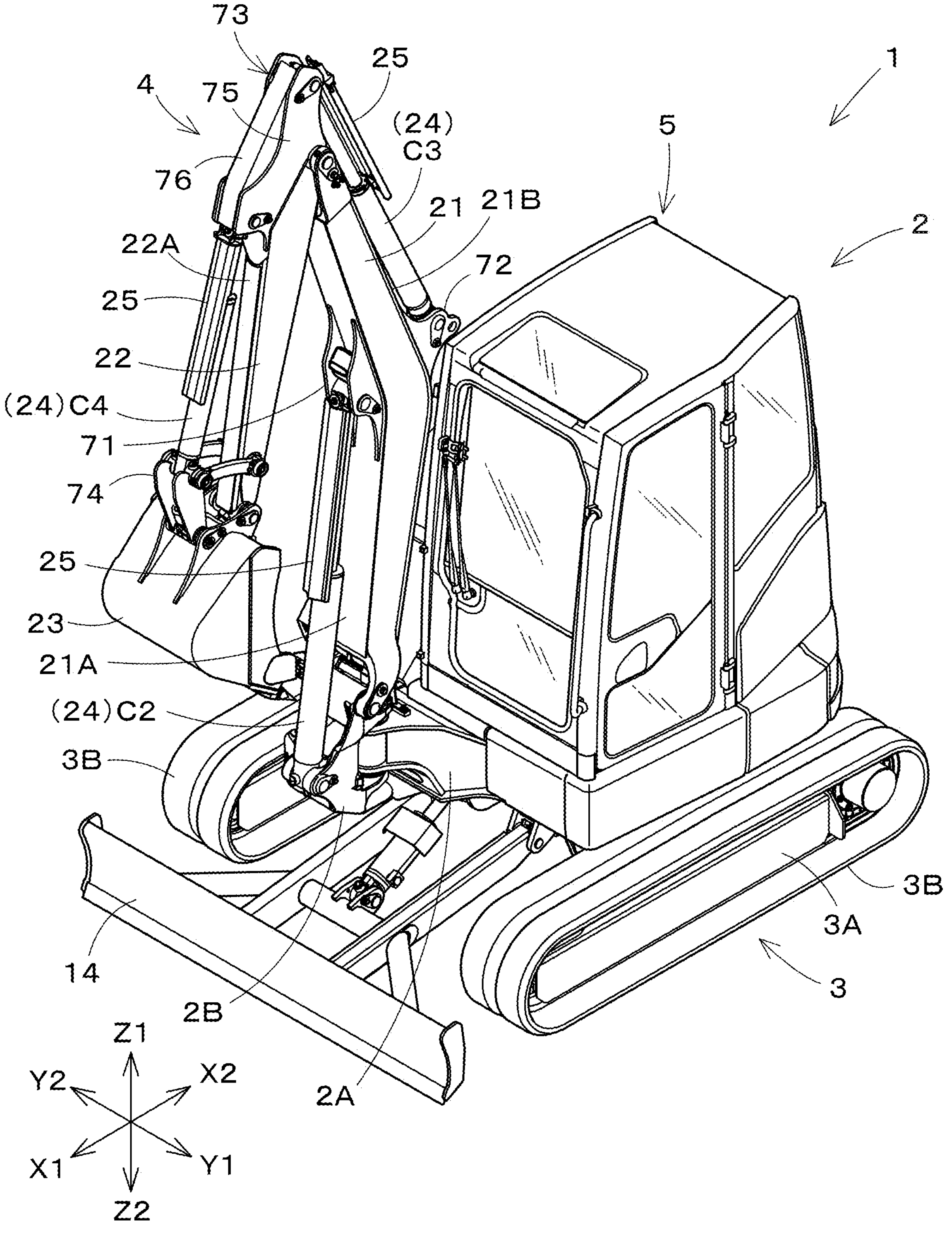
FIG. 1 is a front left perspective view of a working machine.

Example embodiments will now be described with reference to the accompanying drawings, wherein like reference numerals designate corresponding or identical elements throughout the various drawings. The drawings are to be viewed in an orientation in which the reference numerals are viewed correctly. Hereinafter, an embodiment of the present invention will be described with reference to the drawings.

Figure 2:
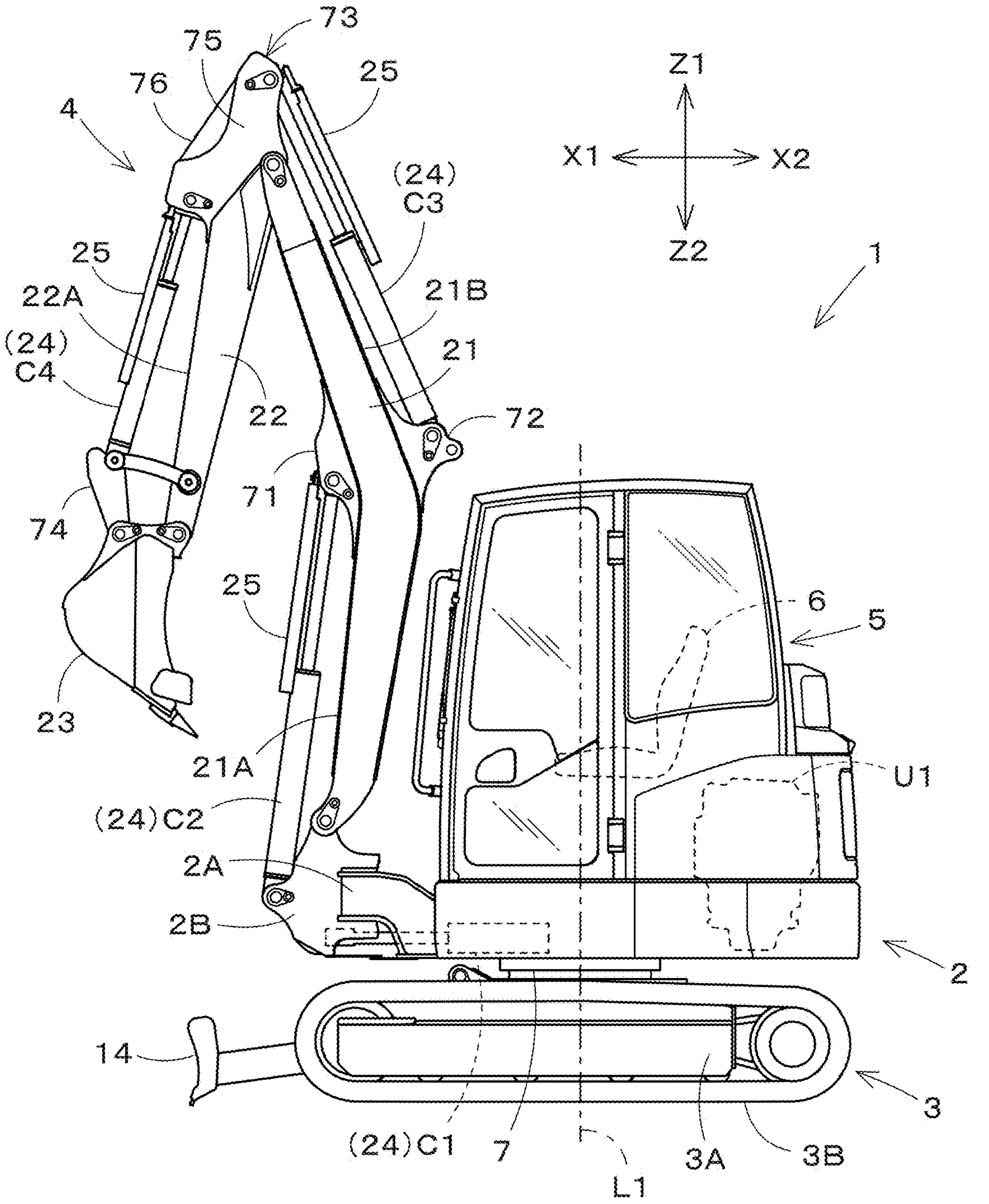
FIG. 2 is a left side view of the working machine.

As illustrated in FIGS. 1 and 2, a working machine 1 according to the present embodiment is a backhoe including a swivel base (machine body) 2, a traveling device 3, and a working device 4. A cabin 5 is mounted on the swivel base 2. As illustrated in FIG. 2, an operator's seat 6 on which a driver sits is provided in the cabin 5. Note that the working machine 1 is not limited to a backhoe and may be a working machine of another kind.

Hereinafter, a direction (a direction indicated by arrow X1 in FIGS. 1 and 2 and other drawings) in which the driver sitting on the operator's seat 6 faces is referred to as a forward direction for the swivel base 2, and a direction (a direction indicated by arrow X2 in FIGS. 1 and 2 and other drawings) opposite to the forward direction is referred to as a rearward direction for the swivel base 2. A left side as viewed from the driver (a direction indicated by arrow Y1 in FIGS. 1 and 3 and other drawings) is referred to as a leftward direction for the swivel base 2, and a right side as viewed from the driver (a direction indicated by arrow Y2 in FIGS. 1 and 3 and other drawings) is referred to as a rightward direction for the swivel base 2. Furthermore, an upper side as viewed from the driver (a direction indicated by arrow Z1 in FIGS. 1 and 2 and other drawings) is referred to as an upward direction for the swivel base 2, and a lower side as viewed from the driver (a direction indicated by arrow Z2 in FIGS. 1 and 2 and other drawings) is referred to as a downward direction for the swivel base 2.

Machine Body

As illustrated in FIG. 2, the swivel base (the machine body) 2 is supported on an upper portion of the traveling device 3 with a swivel bearing 7 interposed therebetween so as to be swivelable in a left-right direction. That is, the swivel base 2 is supported so as to be rotatable about a swivel axis (an axis extending in an up-down direction) L1 with respect to the traveling device 3. Note that the swivel axis L1 is a center of rotation of the swivel bearing 7.

Figure 3:
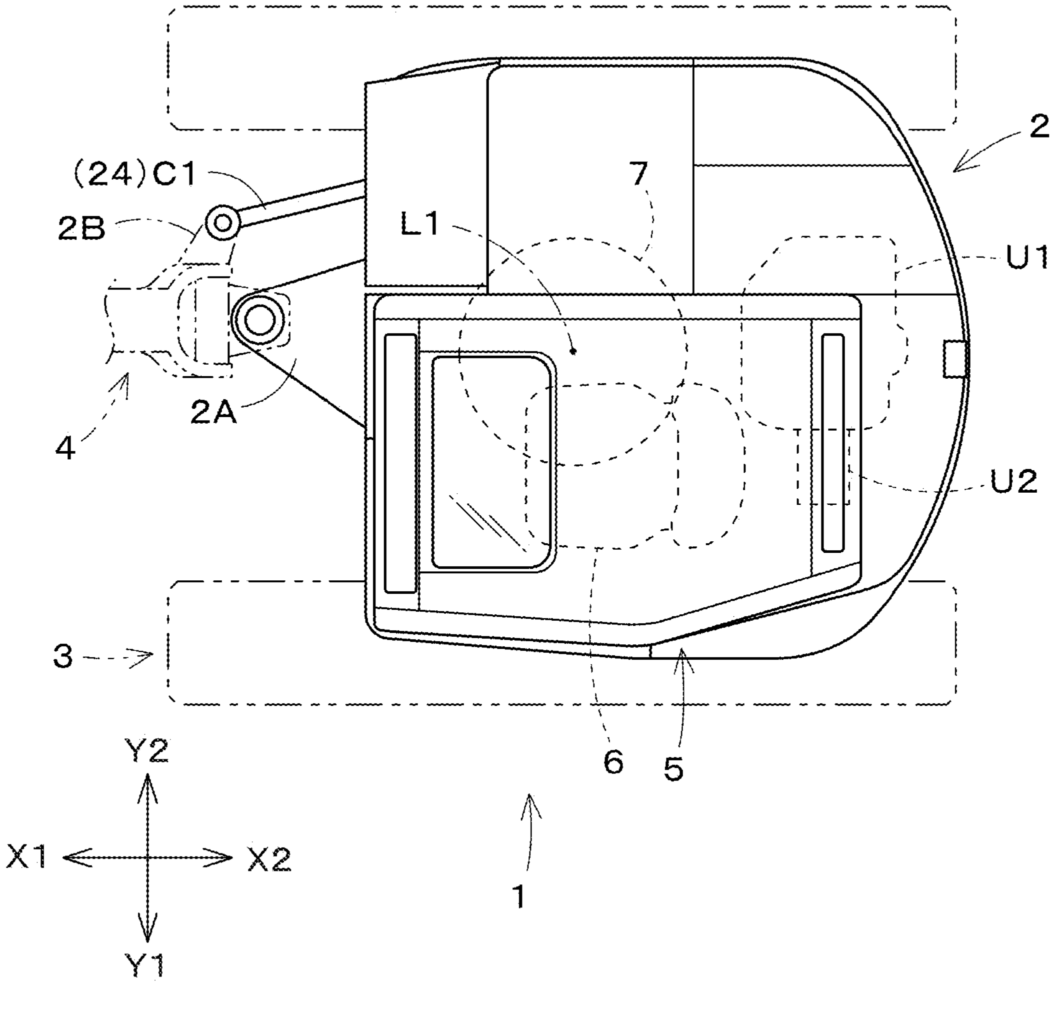
FIG. 3 is a top view of a swivel base.

As illustrated in FIG. 3, a prime mover U1 is mounted in a rear portion of an inside of the swivel base 2. The prime mover U1 is a diesel engine. Note that the prime mover U1 may be a gasoline engine, may be an electric motor, or may be a hybrid type including an engine and an electric motor. A hydraulic pump U2 is coupled to the prime mover U1. The hydraulic pump U2 is driven by power of the prime mover U1 and supplies a hydraulic fluid (hydraulic oil) to a hydraulic actuator such as a hydraulic motor provided in the working machine 1 or a hydraulic cylinder 24, which will be described later.

Traveling Device

As illustrated in FIGS. 1 and 2, the traveling device 3 includes a traveling frame 3A and a traveling mechanism 3B. The traveling frame (truck frame) 3A is a structure to which the traveling mechanism 3B is attached and on which the swivel base 2 is supported from below. The traveling mechanism 3B is, for example, a crawler type. A dozer device 14 is mounted on a front portion of the traveling device 3. Note that the traveling device 3 is not limited to a crawler type and may be a wheel type.

Working Device

The working device 4 is provided on a front side of the swivel base 2 and is driven by a hydraulic fluid delivered from the hydraulic pump U2. The working device 4 is coupled to a support bracket 2A provided on a front portion of the swivel base 2 with a swing bracket 2B interposed therebetween. The swing bracket 2B is pivotally supported on a front portion of the support bracket 2A so as to be swingable about a vertical axis (an axis extending in the up-down direction).

The working device 4 includes a boom 21, an arm 22, and a bucket (working tool) 23. A base end portion of the boom 21 is pivotally supported on the swing bracket 2B so as to be swingable about a horizontal axis (an axis extending in the left-right direction). That is, the boom 21 is pivotally coupled to the swing bracket 2B so as to be swingable in the up-down direction. A base end portion of the arm 22 is pivotally supported on a head portion of the boom 21 so as to be swingable about a horizontal axis (an axis extending in the left-right direction). That is, the arm 22 is pivotally coupled to the boom 21 so as to be swingable in a front-rear direction and the up-down direction. A base end portion of the bucket 23 is pivotally supported on a head portion of the arm 22 so as to be swingable about a horizontal axis (an axis extending in the left-right direction). That is, the bucket 23 is pivotally coupled to the arm 22 so as to be capable of performing a shoveling action and a dumping action. Instead of or in addition to the bucket 23, another working tool (hydraulic attachment) that can be driven by a hydraulic fluid can be attached to the working machine 1. Examples of such a working tool include a hydraulic breaker, a hydraulic crusher, an angle broom, an earth auger, a pallet fork, a sweeper, a mower, and a snow blower.

Figure 4:
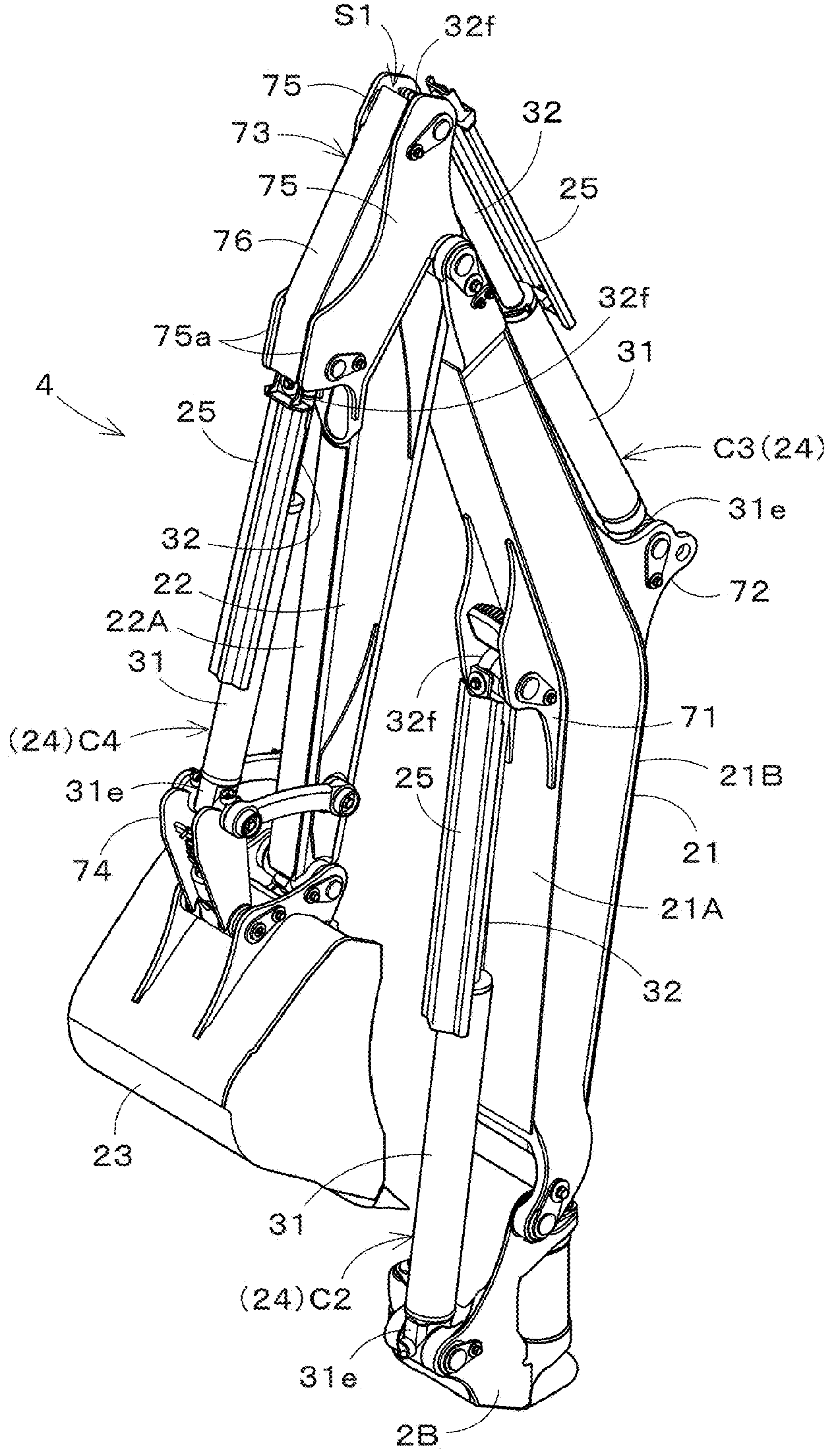
FIG. 4 is a front perspective view of a working device.

The working device 4 is driven by the hydraulic cylinder 24. The hydraulic cylinder 24 includes a swing cylinder C1, a boom cylinder C2, an arm cylinder C3, and a bucket cylinder (working tool cylinder) C4. The swing bracket 2B is swingable by telescopic movement of the swing cylinder C1. The boom 21 is swingable by telescopic movement of the boom cylinder C2. The arm 22 is swingable by telescopic movement of the arm cylinder C3. The bucket 23 is capable of performing a shoveling action and a dumping action by telescopic movement of the bucket cylinder C4. As illustrated in FIG. 2, the swing cylinder C1 is provided in a lower front portion of the swivel base 2 and couples a machine body frame of the swivel base 2 and the swing bracket 2B. As illustrated in FIGS. 1, 2, and 4, the boom cylinder C2 is provided so as to face a base end of a lower surface of the boom 21 (a base end of a front surface of the boom 21 standing upright) and couples the swing bracket 2B and the boom 21. The arm cylinder C3 is provided so as to face a heading end of an upper surface of the boom 21 (a heading end of a rear surface of the boom 21 when standing upright) and couples the boom 21 and the arm 22. The bucket cylinder C4 is provided so as to face an upper surface of the arm 22 (a front surface of the arm 22 bent downward) and couples the arm 22 and the bucket 23.

The hydraulic cylinder 24 is provided with a cylinder cover 25 that protects a cylinder rod 32 of the hydraulic cylinder 24. Although the cylinder cover 25 is provided at three positions, specifically, the boom cylinder C2, the arm cylinder C3, and the bucket cylinder C4 in the present embodiment, the cylinder cover 25 may be provided at two positions, specifically, the arm cylinder C3 and the bucket cylinder C4 or may be provided at only one position, specifically, the boom cylinder C2, the arm cylinder C3, or the bucket cylinder C4.

Figure 5:
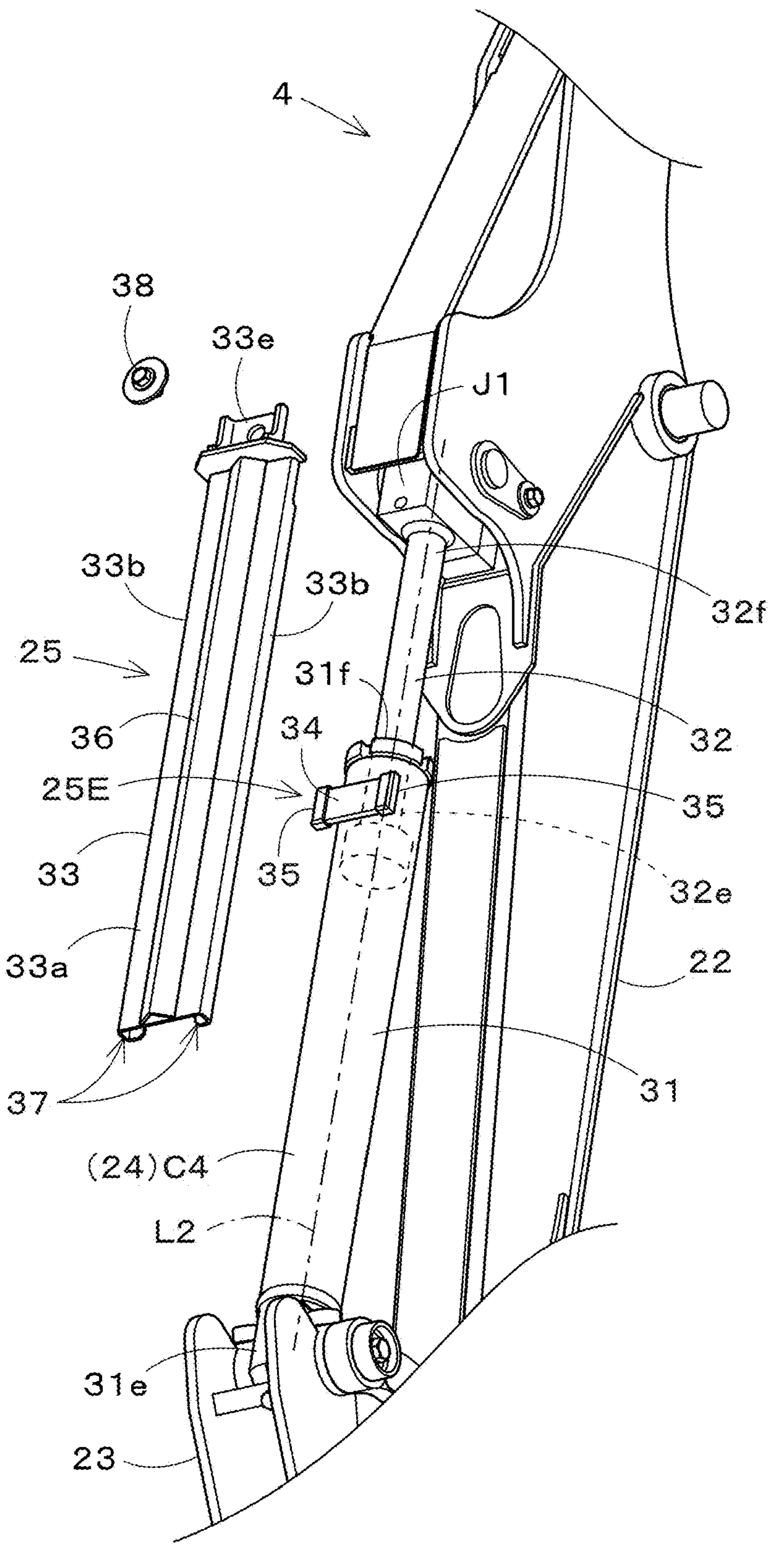
FIG. 5 is a partial exploded perspective view of a hydraulic cylinder and surroundings thereof.

Since the swing cylinder C1, the boom cylinder C2, the arm cylinder C3, and the bucket cylinder C4 have an identical overall basic configuration although they are different in stroke length, pressure capability, and an attachment position, the following describes a basic configuration of the hydraulic cylinder 24 by taking the bucket cylinder C4 as an example. As illustrated in FIG. 5, the bucket cylinder C4 includes a cylinder tube 31 and a cylinder rod 32. The cylinder tube 31 is a cylindrical body, and a base end portion 31*e* is coupled to an upper end of a front portion of the bucket 23. The cylinder rod 32 is a columnar shaft body and is inserted into the cylinder tube 31 and is held in the cylinder tube 31 while protruding in an extending direction from a heading end portion 31*f* of the cylinder tube 31. That is, the cylinder rod 32 is inserted into the cylinder tube 31 and is held in the cylinder tube 31 so as to be slidable in a direction of extension of an axis line L2. A base end portion 32*e* of the cylinder rod 32 is inserted into the cylinder tube 31, and a heading end portion 32*f* of the cylinder rod 32 is coupled to a front portion of the arm 22.

As illustrated in FIGS. 1, 2, and 4, the working device 4 includes a first cylinder bracket 71, a second cylinder bracket 72, a third cylinder bracket (cylinder bracket) 73, and a fourth cylinder bracket 74. The first cylinder bracket 71 is provided on a first surface portion 21A of a circumferential surface of the boom 21. The second cylinder bracket 72 is provided on a second surface portion 21B of the circumferential surface of the boom 21. The third cylinder bracket 73 is provided on a base end portion of the arm 22. The fourth cylinder bracket 74 is provided on a base end portion of the bucket 23.

The boom cylinder C2 is configured such that the heading end portion 32*f* of the cylinder rod 32 is pivotally coupled to the first cylinder bracket 71 and the base end portion 31*e* of the cylinder tube 31 is pivotally coupled to the swing bracket 2B. The arm cylinder C3 is configured such that the heading end portion 32*f* of the cylinder rod 32 is pivotally coupled to the third cylinder bracket 73, and the base end portion 31*e* of the cylinder tube 31 is pivotally coupled to the second cylinder bracket 72. The bucket cylinder C4 is configured such that the heading end portion 32*f* of the cylinder rod 32 is pivotally coupled to the third cylinder bracket 73 and the base end portion 31*e* of the cylinder tube 31 is pivotally coupled to the fourth cylinder bracket 74. A detailed structure of the third cylinder bracket 73 will be described later.

Cylinder Cover

As illustrated in FIG. 5, the cylinder cover 25 of the present embodiment includes a cover body 33 and a guide portion 25E. The guide portion 25E includes a guide plate 34 and end caps (end portions) 35. The cover body 33 is an elongated frame body having a flattened substantially U-shaped cross section and extends in the same direction as the axis line L2, that is, in the same direction as the direction in which the cylinder rod 32 (the hydraulic cylinder 24) extends on a front side relative to the bucket cylinder C4 (on an outer side relative to the cylinder rod 32). Note that in the description of the cylinder cover 25, the extension direction of the cylinder rod 32 (the direction of extension of the axis line L2) is referred to as a length direction of the cylinder cover 25, a width direction of the cover body 33 that is perpendicular to the extension direction of the cylinder rod 32 is referred to as a horizontal width direction, and a thickness direction of the cover body 33 that is perpendicular to the extension direction of the cylinder rod 32 is referred to as a vertical width direction of the cylinder cover 25.

Figure 6:
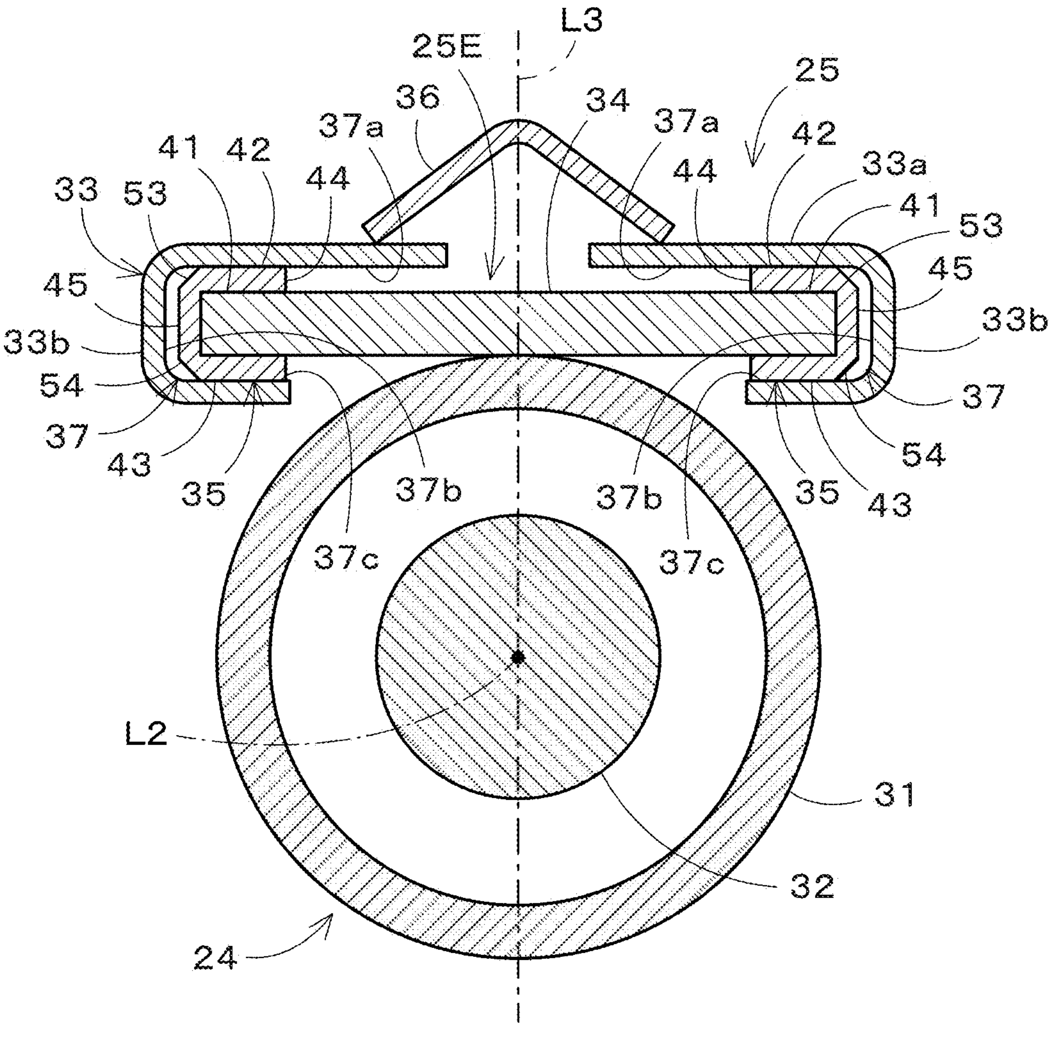
FIG. 6 is a cross-sectional view of a cylinder cover viewed from a lower side.

A base end portion 33*e* of the cover body 33 is fixedly screwed to a connection portion J1 between the heading end portion 32*f* of the cylinder rod 32 and the arm 22 with the use of a bolt 38 from a direction normal to a support surface of the connection portion J1. That is, the cover body 33 is configured such that the base end portion (first end) 33*e* is attached to a head side portion (the connection portion J1) of the cylinder rod 32 with the use of the bolt 38, and is movable together with the cylinder rod 32 according to a telescopic movement of the hydraulic cylinder 24. On an outer side surface (cover outer side surface) 33*a* of the cover body 33 that is opposite to the cylinder tube 31, a reinforcing rib 36 having a V-shaped cross section that bulges outward in the vertical width direction (a direction normal to the outer side surface 33*a*) is provided. The reinforcing rib 36 extends in the length direction along a central portion of the cover outer side surface 33*a* in the horizontal width direction. Note that although the reinforcing rib 36 is a member separate from the cover body 33 and is fixed to the cover outer side surface 33*a* by welding or the like as illustrated in FIG. 6 in the present embodiment, the reinforcing rib 36 may be formed integrally with the central portion of the cover outer side surface 33*a* in the horizontal width direction by bending, pressing, or the like. Slide groove portions 37 having a U-shaped cross section are provided on an inner side surface of the cover body 33 that faces the cylinder tube 31. The slide groove portions 37 extend in the length direction along side edge portions 33*b* of the cover body 33 in the horizontal width direction and are opened toward a center of the cover body 33 in the horizontal width direction (inward in the horizontal width direction).

The guide plate 34 is a rectangular plate that is long in the horizontal width direction of the cylinder cover 25 and is provided on an outer circumferential surface of the cylinder tube 31 so as to extend in a direction of tangent to an outer circumference of a cross section perpendicular to the extension direction of the cylinder tube 31. That is, the guide plate 34 is fixed to the cylinder tube 31 so that both shorter-side end surfaces (guide end portions) 41 protrude in a circumferential direction beyond the outer circumferential direction of the cylinder tube 31 (see FIG. 6). The end caps 35 are mounted on the guide end portions 41. As illustrated in FIG. 6, the guide end portions 41 are inserted into the slide groove portions 37 from a central side (inner side) of the cover body 33 in the horizontal width direction. In this way, the cover body 33 is engaged and held so as to be slidable in the length direction (the direction of the axis line L2) with respect to the cylinder cover 25. In this state, first side surfaces (cap first side surfaces) 42 of the end caps 35 that are opposite to the cylinder tube 31 are engaged in contact with surfaces (first portions) of the slide groove portions 37 opposite to the cylinder tube 31, and second side surfaces (cap second side surfaces) 43 of the end caps 35 that are close to the cylinder tube 31 are engaged in contact with surfaces (third portions) 37*c* close to the cylinder tube 31. In the present embodiment, the cap first side surfaces 42 and the cap second side surfaces 43 each have a flat surface shape.

Figure 7:
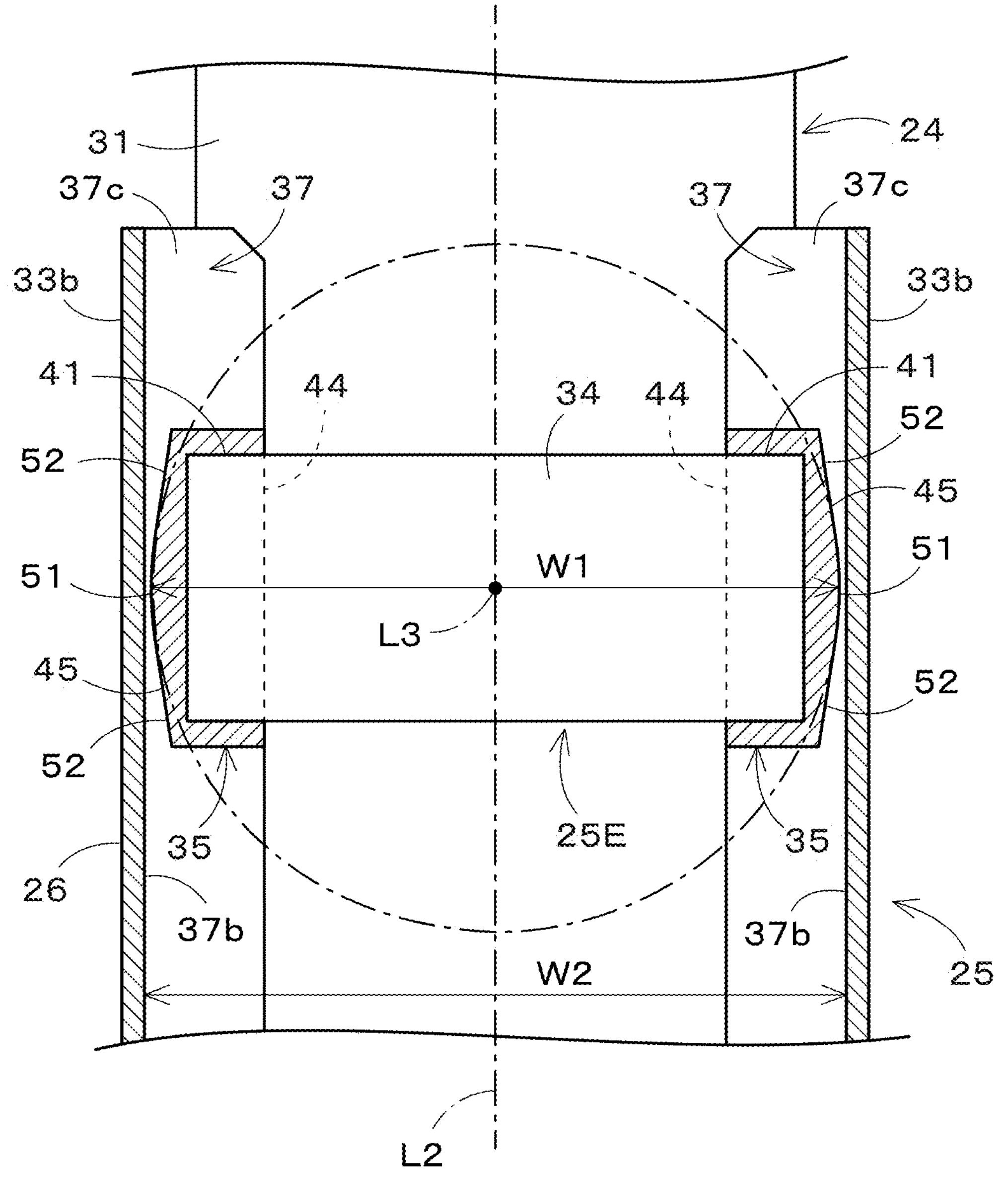
FIG. 7 is a cross-sectional view of the cylinder cover viewed from a front side.

The end caps 35 are flattened cap bodies each having, in an inner end surface 44, an insertion hole into which the guide plate 34 is inserted, and are fixed so as to cover the guide end portions 41. As illustrated in FIG. 7, end surfaces (cap end surfaces) 45 of the end caps 35 in the direction of tangent have a substantially V-shape so as to bulge toward groove inner surface portions 37*b* of the slide groove portions 37 when viewed from a direction normal to the plate surface of the guide plate 34.

First curved convex surface portions 51, which are tip portions of the cap end surfaces 45, are curved in an arc shape so that a shape thereof viewed from the direction normal to the plate surface of the guide plate 34 bulges toward the groove inner surface portions 37*b* of the slide groove portions 37. A distance (a dimension between the cap ends) W1 between the first curved convex surface portions 51 of the cap end surfaces 45 on both sides in the direction of tangent is set smaller than a separation width (a dimension between groove inner side surfaces) W2 by which the groove inner surface portions 37*b* on both sides in the direction of tangent are separated. Accordingly, a gap is formed between the first curved convex surface portion 51 and the groove inner surface portion 37*b* so that the first curved convex surface portion 51 is not always in close contact with the groove inner surface portion 37*b*. The first curved convex surface portions 51 have an arc shape that defines a part of a circle having a diameter smaller than a circle whose diameter is the dimension W2 between the groove inner side surfaces. In the present embodiment, the first curved convex surface portions 51 have an arc shape having a diameter identical to the dimension W1 between the cap ends, and arc centers L3 thereof match. That is, the first curved convex surface portions 51 on both sides in the direction of tangent have concentric arc shapes.

Each of the cap end surfaces 45 includes an inclined surface portion 52 on both sides of the first curved convex surface portion 51 in the extension direction of the cylinder rod 32. Each inclined surface portion 52 is inclined farther away from the groove inner surface portion (second portion) 37*b* as a distance from the first curved convex surface portion 51 increases in the extension direction of the cylinder rod 32. In the present embodiment, the inclined surface portion 52 is inclined by 5 degrees from a direction parallel to the axis line L2. The inclined surface portion 52 extends in a direction of tangent to an outer circumference of the first curved convex surface portion 51. That is, the inclined surface portion 52 is continuously formed from an outer circumferential arc curved surface of the first curved convex surface portion 51 in the direction of tangent. As illustrated in FIG. 6, both of corner portions 53 of the cap end surfaces 45 that are located opposite to the cylinder tube 31 and corner portions 54 of the cap end surfaces 45 that are close to the cylinder tube 31 are tapered at substantially 45 degrees. That is, the cap end surfaces 45 are formed so that both of the corner portions 53 located opposite to the cylinder tube 31 and the corner portions 54 close to the cylinder tube 31 are chamfered in a cross section perpendicular to the extension direction of the cylinder rod 32. Accordingly a predetermined gap is defined between the corner portion 53, 54 and an inner corner portion of the slide groove portion 37.

In the present embodiment, the end caps 35 are made of a synthetic resin material such as a vinyl chloride resin or a polycarbonate resin. On the other hand, the cover body 33 is made of a metal material such as iron or stainless steel. That is, the end caps 35 and the cover body 33 are made of different materials. The end caps 35 may be made of an elastic member. This can prevent or reduce noise, breakage, deformation, or the like occurring due to friction and contact between the end caps 35 and the cover body 33.

Cylinder Bracket

Figure 8:
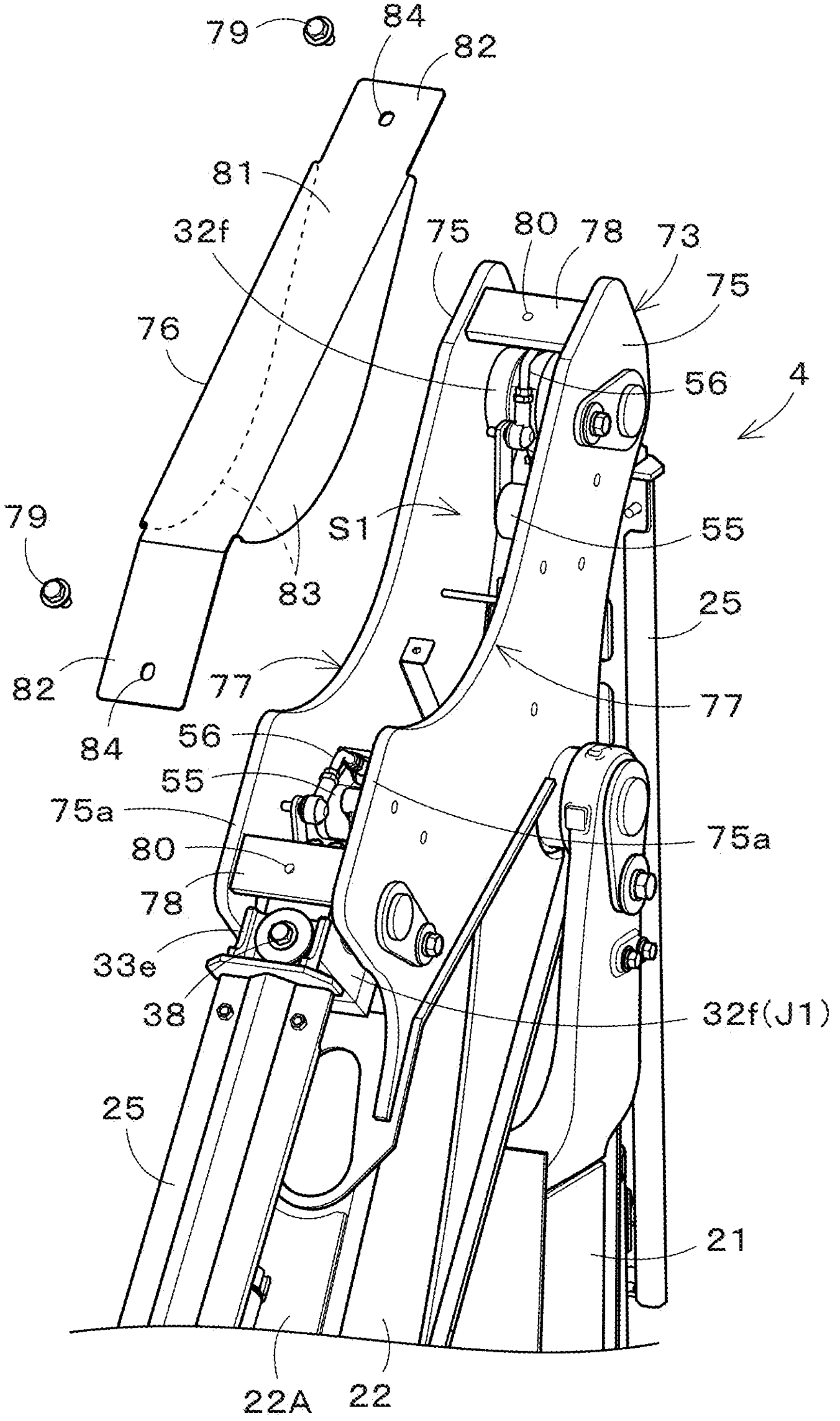
FIG. 8 is a partial exploded perspective view of a third cylinder bracket and surroundings thereof.

As illustrated in FIGS. 4 and 8, the third cylinder bracket (cylinder bracket) 73 includes a pair of bracket side plates 75 and a cover plate 76. The pair of bracket side plates 75 are substantially flat plates and stand on the first surface portion 22A of the circumferential surface of the arm 22 so as to be separated from each other in the left-right direction. The heading end portion 32*f* of the cylinder rod 32 of the arm cylinder C3 and the heading end portion 32*f* of the cylinder rod 32 of the bucket cylinder C4 are each pivotally supported while being held between the bracket side plates 75.

The bracket side plates 75 are each made of a metal thick plate having high flexural rigidity so as not to be curved by stress applied from the arm cylinder C3 and the bucket cylinder C4 during driving of the working device 4. As illustrated in FIG. 8, members such as a potentiometer 55 that detects swing amounts of the arm 22 and the bucket 23 and a hydraulic hose 56 that guides a hydraulic fluid to each hydraulic cylinder 24 are stored in a separation space S1 between the bracket side plates 75. Accordingly, the bracket side plates 75 also have an effect of protecting the members such as the potentiometer 55 and the hydraulic hose 56 from collision with an external object.

The bracket side plates 75 each have a thinned portion 77. The thinned portion 77 according to the present embodiment is a cutout formed in a head edge portion 75*a* of the bracket side plate 75 so as to have a substantially arc shape when viewed from a direction normal to a plate surface of the bracket side plate 75. The thinned portion 77 has a position and a size that do not overlap portions where the members such as the potentiometer 55 and the hydraulic hose 56 are disposed when viewed from the direction normal to the plate surface of the bracket side plate 75. Note that the thinned portion 77 may be a through hole passing between the plate surfaces of the bracket side plates 75.

A cover support portion 78 is horizontally provided between the left and right bracket side plates 75. The cover support portion 78 is a substantially flat plate and is fixedly supported on surfaces of the bracket side plates 75 that face the separation space S1. The cover support portion 78 includes a screw hole 80 into which a cover fixing screw 79 can be screwed. The cover fixing screw 79 is screwed into the screw hole 80 from a direction normal to a plate surface of the cover support portion 78 with the cover plate 76 interposed therebetween. That is, the cover plate 76 is fixedly coupled to the cover support portion 78 with the cover fixing screw 79.

The cover support portion 78 is disposed at a position close to the heading end portion 32*f* of the cylinder rod 32 of the arm cylinder C3 and at a position close to the head edge portion 75*a* of the bracket side plate 75 at the heading end portion 32*f* of the cylinder rod 32 of the bucket cylinder C4.

The cover support portion 78 close to the bucket cylinder C4 is disposed outward of the base end portion 33*e* of the cylinder cover 25 in the direction in which the cover body 33 extends (on a central side of the third cylinder bracket 73). That is, the cover support portion 78 is positioned not to overlap an attachment portion of the bolt 38 when viewed from an axis line direction (first direction) of the bolt 38 for attaching the base end portion 33*e* of the cylinder cover 25 to the connection portion J1.

The cover plate 76 is a metal plate body having a smaller plate thickness and a lighter weight than the bracket side plates 75 and is fixedly supported along inner sides of the head edge portions 75*a* of the bracket side plates 75. The cover plate 76 covers the separation space S1 between the bracket side plates 75 from a side where the head edge portions 75*a* of the bracket side plates 75 are present. The cover plate 76 includes a cover body 81, a fixed piece 82, and a lid piece 83.

Figure 9:
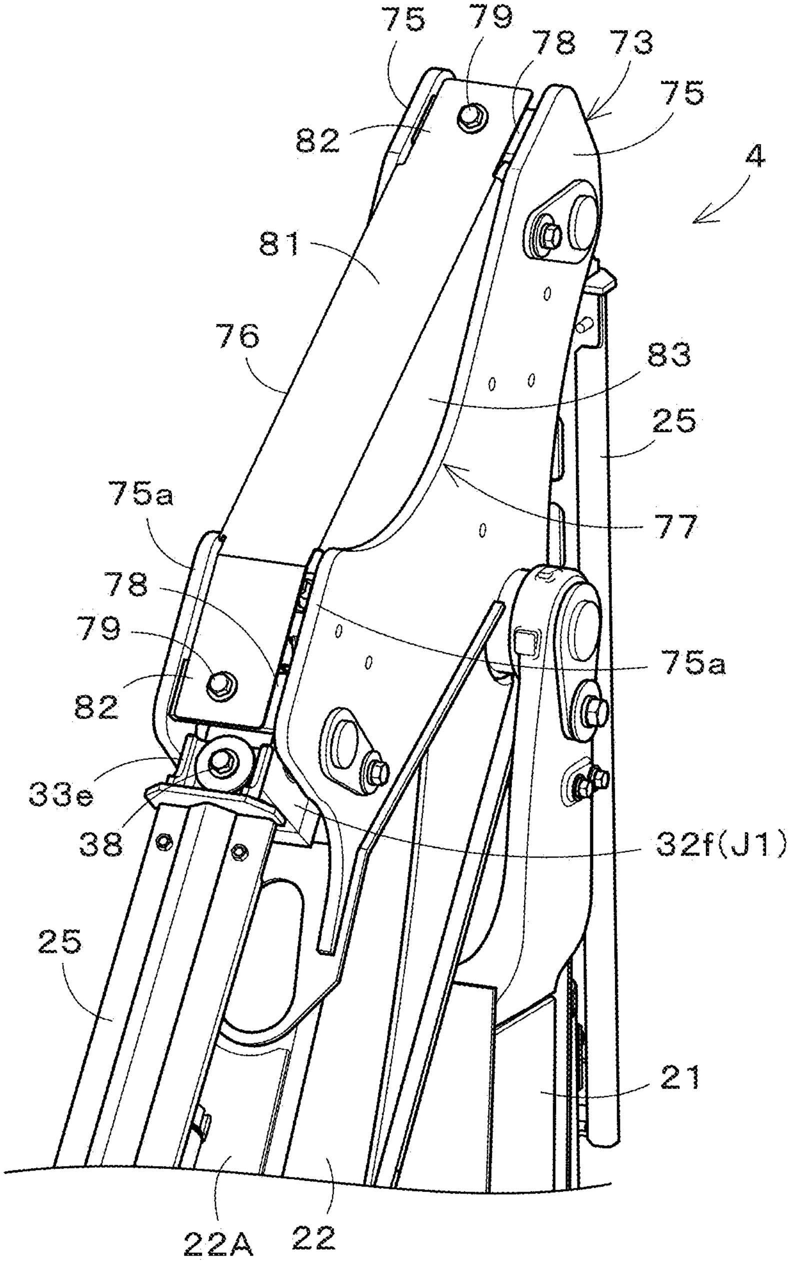
FIG. 9 is a perspective view of the third cylinder bracket and surroundings thereof.

The cover body 81 has a rectangular flat plate shape whose width dimension in the left-right direction is substantially identical to the separation space S1. The fixed piece 82 is a plate piece having a rectangular flat plate shape and is provided on both short edge portions of the cover body 81. The fixed piece 82 includes a screw insertion hole 84 into which the cover fixing screw 79 can be inserted. The fixed piece 82 is fixed by the cover fixing screw 79 while being supported to face the cover support portion 78. That is, as illustrated in FIG. 9, the cover plate 76 is fixed at a position that does not overlap the attachment portion of the bolt 38 when viewed from the axis line direction (first direction) of the bolt 38 for fixing the base end portion 33*e* of the cylinder cover 25 to the connection portion J1. This makes it possible to replace the cylinder cover 25 without detaching the cover plate 76 from the cover support portion 78.

The lid piece 83 is a plate piece having an end edge shape substantially identical to the shape of the thinned portion 77 of the bracket side plate 75 and is provided on both long edge portions of the cover body 81. The lid piece 83 is bent toward one plate surface of the cover body 81. In this way, the lid piece 83 is formed in a substantially arc shape when viewed from the direction normal to the plate surface of the bracket side plate 75, and covers the whole thinned portion 77 from an inner side of the bracket side plate 75 when the cover plate 76 is attached to the bracket side plate 75 as described above. This can prevent or reduce entry of a foreign substance such as dirt or dust into the separation space S1.

In the present embodiment, each lid piece 83 is bent by substantially 90 degrees in the direction normal to the one plate surface of the cover body 81. The cover plate 76 thus obtains rigidity higher than a mere flat plate. Furthermore, when the cover plate 76 is attached to the bracket side plates 75, the lid pieces 83 are pressed against the inner sides of the bracket side plates 75 due to resilience to bending. That is, the lid pieces 83 can cover the thinned portions 77 in close contact with the inner sides of the bracket side plates 75. This can more effectively prevent or reduce entry of a foreign substance into the separation space S1.

Other Embodiments

Although the first curved convex surface portions 51 have an arc shape having a diameter identical to the dimension W1 between the cap ends in the above embodiment, the first curved convex surface portions 51 may have an arc shape (e.g., a semi-circular small-diameter convex shape) having a diameter smaller than the dimension W1 between the cap ends, as long as contact resistance between the end caps 35 and the slide groove portions 37 can be reduced.

Although the first curved convex surface portions 51 of the end caps 35 on both sides in the direction of tangent have concentric arc shapes in the above embodiment, the first curved convex surface portions 51 of the end caps 35 on both sides in the direction of tangent may be eccentric from each other in the extension direction of the cylinder rod 32 or in a direction perpendicular to the extension direction of the cylinder rod 32 when viewed from the direction normal to the plate surface of the guide plate 34, as long as contact resistance between the end caps 35 and the slide groove portions 37 can be reduced.

Although the cap end surfaces 45 each have a V shape when viewed from the direction normal to the plate surface of the guide plate 34 and the adjacent face portions (inclined surface portions) 52 on both sides of the first curved convex surface portion 51 in the extension direction of the cylinder rod 32 form inclined surfaces in the above embodiment, the adjacent face portions 52 may have a flat surface shape substantially parallel to the groove inner surface portion 37*b*, as long as contact of a portion of the end cap 35 other than the first curved convex surface portion 51 with the groove inner surface portion 37*b* can be prevented or reduced in a case where an angle of the direction in which the slide groove portion 37 extends with respect to the guide plate 34 is deviated.

Figure 10:
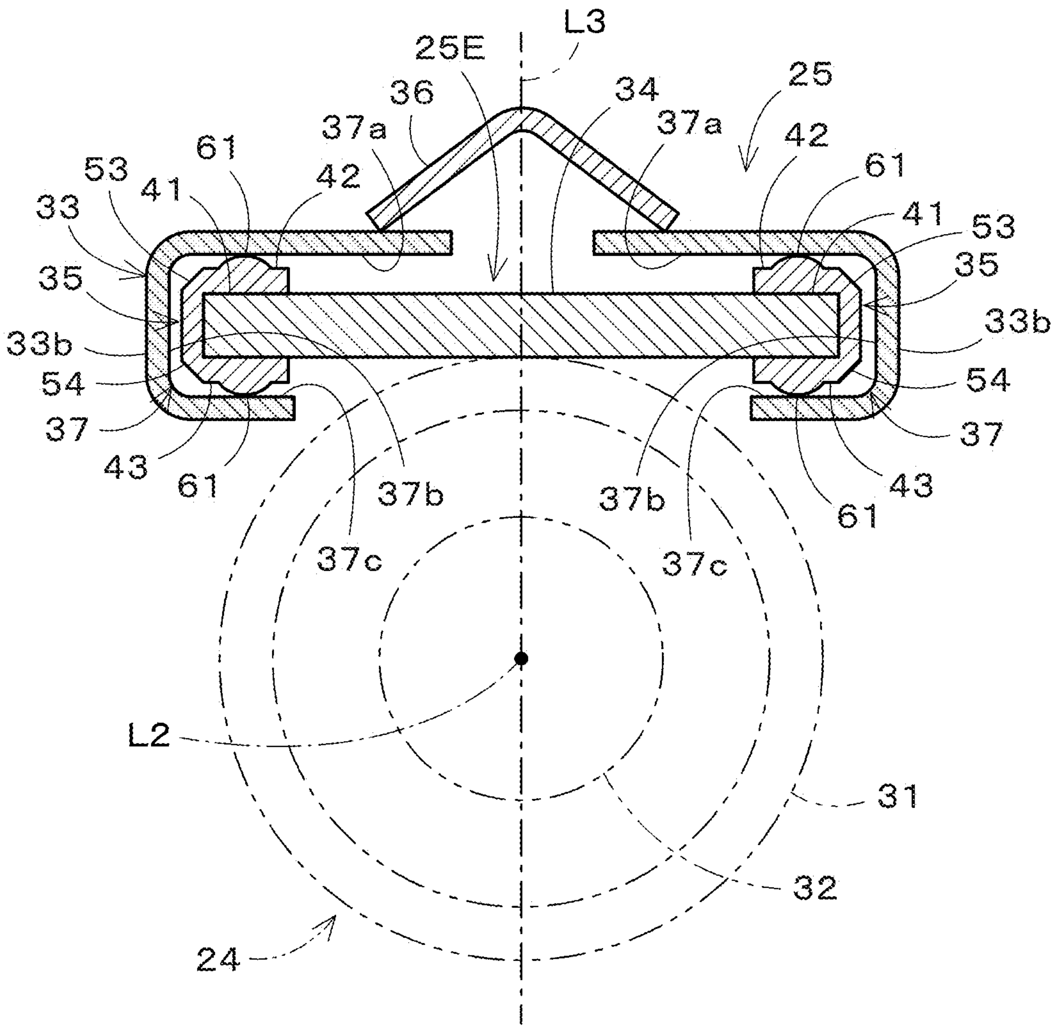
FIG. 10 is a cross-sectional view of a cylinder cover according to another embodiment viewed from a lower side.

Although the end caps 35 are formed so that the surfaces (cap first side surfaces) 42 located opposite to the cylinder tube 31 and the surfaces (cap second side surfaces) 43 close to the cylinder tube 31 have a flat surface shape and are in planar contact with the first portions 37*a* and the third portions 37*c* of the slide groove portions 37 in the above embodiment, each of the end caps 35 may have, on at least one of the cap first side surface 42 and the cap second side surface 43*a*, a second curved convex surface portion 61 curved so as to bulge in the direction normal to the plate surface of the guide plate 34, as illustrated in FIG. 10. A shape of a cross section of the second curved convex surface portion 61 that is perpendicular to the extension direction of the cylinder rod 32 may have an arc shape. The second curved convex surface portion 61 may be formed only in central portions of the cap first side surfaces 42 and the cap second side surfaces 43 or may be formed throughout entire surfaces between left and right of the cap first side surfaces 42 and the cap second side surfaces 43. The second curved convex surface portion 61 may have a spherical shape or may have an arc shape when viewed from the direction of tangent, as long as contact resistance between the end caps 35 and the slide groove portions 37 can be reduced. A plurality of second curved convex surface portions 61 may be provided on each of the cap first side surfaces 42 and the cap second side surfaces 43.

Although the configuration in which the end caps (end portions) 35 are mounted to both end portions of the guide plate 34 has been described in the above embodiment, the configuration of the end portions is not limited to this. For example, the end portions may have a shape different from the cap shape and the end portions may be integral with the guide plate 34.

Effects

As described above, in the present example embodiment, a cylinder cover 25 is mounted on a hydraulic cylinder 24 and protects a cylinder rod 32 of the hydraulic cylinder 24. The cylinder cover 25 includes a cover body 33 that includes a first end (base end portion 33*e*) attached to a head side portion (connection portion J1) of the cylinder rod 32 and moves together with the cylinder rod 32 according to a telescopic movement of the hydraulic cylinder 24; and a guide portion 25E to support the cover body 33 such that the cover body 33 is slidable along an extension direction of the cylinder rod 32. The guide portion 25E includes a guide plate 34 that is provided on an outer circumferential portion of the cylinder tube 31 of the hydraulic cylinder 24 so as to extend in a direction of tangent to an outer circumference of a cross section of the cylinder tube 31 that is perpendicular to an extension direction of the cylinder tube 31, and a pair of end portions (end caps) 35 that are provided on both end portions (guide end portions) 41 of the guide plate 34 in the direction of tangent. The cover body 33 includes first portions 37*a* that face first side surfaces (cap first side surfaces) 42 of the end portions 35 that are located opposite to the cylinder tube 31, second portions (groove inner surface portion) 37*b* that face end surfaces (cap end surfaces) 45 of the end portions 35 in the direction of tangent, and third portions 37*c* that face second side surfaces (cap second side surface) 43 of the end portions 35 that are close to the cylinder tube 31. Each of the end portions 35 includes, on the end surface 45 thereof, a first curved convex surface portion 51 curved such as to bulge toward the second portion 37*b*.

According to this configuration, it is possible to reduce a gap between the end surfaces 45 of the end portions 35 and the second portions (groove inner surface portions) 37*b* of the cover body 33 and reduce contact resistance between the end surfaces 45 and the second portions 37*b*. It is therefore possible to prevent or reduce occurrence of abnormal sound and vibration and achieve smooth operation.

The first curved convex surface portion 51 has an arc shape when viewed from a direction normal to a plate surface of the guide plate 34. According to this configuration, it is possible to further reduce the contact resistance between the end portions 35 and the cover body 33, and therefore it is possible to achieve more smooth operation.

The first curved convex surface portion 51 has an arc shape that defines a part of a circle having a diameter smaller than a circle whose diameter is a separation width W2 by which the second portions (groove inner surface portion) 37*b* provided on both sides of the cover body 33 in the direction of tangent are separated. In a case where a radius of curvature of the first curved convex surface portion 51 is large, a contact area increases along with deformation depending on a material of the end portions 35. However, according to the above configuration, it is possible to reduce a contact area between the end portions 35 and the cover body 33, and therefore it is possible to achieve more smooth operation.

The first curved convex surface portions 51 of the end portions 35 provided on both sides in the direction of tangent have concentric arc shapes. According to this configuration, stress occurring when the first curved convex surface portions 51 of the end portions 35 make contact with the second portions 37*b* is concentrated in an identical center direction, and therefore a sliding direction of the cover body 33 is less likely to be deviated. It is therefore possible to prevent or reduce occurrence of abnormal sound and vibration and achieve more smooth operation.

Each of the end surfaces 45 includes, on both sides of the first curved convex surface portion 51 in the extension direction of the cylinder rod 32, an inclined surface portion 52 inclined farther away from the second portion 37*b* as a distance from the first curved convex surface portion 51 increases in the extension direction of the cylinder rod 32. According to this configuration, a portion of the end portion 35 other than the first curved convex surface portion 51 is less likely to make contact with the second portion 37*b* even in a case where the angle of the direction in which the cover body 33 extends with respect to the guide plate 34 is deviated, and therefore it is possible to reduce the contact resistance between the end portion 35 and the cover body 33. It is therefore possible to further prevent or reduce occurrence of abnormal sound and vibration and achieve more smooth operation.

A cross section of each of the end surfaces 45 that is perpendicular to the extension direction of the cylinder rod 32 has a shape curved such as to bulge toward the second portion 37*b* or a corner portion 53 of each of the end surfaces 45 that is located opposite to the cylinder tube and a corner portion 54 of each of the end surfaces 45 that is close to the cylinder tube 31 on the cross section perpendicular to the extension direction of the cylinder rod 32 are chamfered. According to this configuration, it is possible to reduce the contact resistance between the end portions 35 and the cover body 33, and therefore it is possible to achieve more smooth operation.

As another embodiment, each of the end portions 35 includes, on at least one of the first side surface 42 and the second side surface 43, a second curved convex surface portion 61 curved such as to bulge in a direction normal to a plate surface of the guide plate 34. According to this configuration, the second curved convex surface portion (support protrusion) 61 provided on the first side surface 42 or the second side surface 43 of the end portion 35 makes contact with an opposing face portion (the first portion 37*a* or the third portion 37*c*) of the cover body 33, and therefore it is possible to further reduce the contact resistance between the end portions 35 and the cover body 33. Therefore, it is possible to achieve more smooth operation.

A cross section of the second curved convex surface portion 61 that is perpendicular to the extension direction of the cylinder rod 32 has an arc shape. According to this configuration, it is possible to further reduce the contact resistance between the end portions 35 and the cover body 33, and therefore it is possible to achieve more smooth operation.

The end portions 35 are made of a resin member. According to this configuration, it is possible to reduce contact sound and friction sound between the end portions 35 and the cover body 33.

The cylinder cover 25 configured as above is mounted on the hydraulic cylinder 24 according to the present embodiment. According to this configuration, it is possible to realize a hydraulic cylinder that can smoothly operate while properly protecting the cylinder rod 32 of the hydraulic cylinder 24.

In the present example embodiment, a working machine 1 includes a machine body (swivel base) 2; and a working device 4 mounted on the machine body 2. The working device 4 includes the hydraulic cylinder 24 configured as above. According to this configuration, it is possible to achieve smooth operation of the working device 4 while properly protecting the cylinder rod 32 of the hydraulic cylinder 24. It is therefore possible to realize a working machine that can stably operate over a long term.

The working device 4 includes the cylinder bracket 73 that supports a first end portion 32*f* on a head side portion of the cylinder rod 32. The cylinder bracket 73 includes a pair of bracket side plates 75 that stand away from each other in one direction and sandwich the first end portion 32*f* and a cover plate 76 that covers a separation space S1 between the bracket side plates 75. Each of the bracket side plates 75 includes a thinned portion 77. The cover plate 76 includes lid pieces 83 that cover the thinned portions 77.

In general, the cylinder bracket 73 is made of a metal thick plate having high rigidity so as not to be easily deformed by stress applied from the hydraulic cylinder 24 during driving of the working device 4. However, the weight of the whole working device 4 increases accordingly, and mobility is impaired. On the other hand, according to the above configuration, the cylinder bracket 73 can be reduced in weight due to the thinned portions 77 provided in the bracket side plates 75, and therefore mobility of the working device 4 improves. Furthermore, entry of a foreign substance such as dirt or dust from the thinned portions 77 into the separation space S1 between the bracket side plates 75 can be prevented or reduced by the cover plate 76, and therefore stability of operation of the working device 4 improves.

The lid pieces 83 are formed by bending portions of the cover plate 76.

According to this configuration, it is possible to increase rigidity of the whole cover plate 76 even in a case where a plate member having relatively small plate thickness and light weight is used, and therefore it is possible to further achieve a reduction in weight of the cylinder bracket 73.

The first end of the cylinder cover 25 is attached to the head side portion of the cylinder rod 32 from a first direction with use of a bolt 38. The cover plate 76 is provided at a position that does not overlap an attachment portion of the bolt 38 when viewed from the first direction.

According to this configuration, it is possible to perform work of attaching the cylinder cover 25 and work of detaching the cylinder cover 25 without detaching the cover plate 76 from the cover support portion 78, and therefore maintainability improves.

The thinned portion 77 is a cutout formed in a head edge portion 75*a* of each of the bracket side plates 75.

According to this configuration, a formation range of the thinned portion 77 can be made wide, and therefore it is possible to further reduce the weight of the cylinder bracket 73. This further improves mobility of the working device 4.

A working machine 1 includes a machine body 2; and a working device 4 mounted on the machine body 2. The working device 4 includes a hydraulic cylinder 24 that drives the working device 4 and a cylinder bracket 73 that supports a first end portion 32*f* of the hydraulic cylinder 24. The cylinder bracket 73 includes a pair of bracket side plates 75 that stand away from each other in one direction and sandwich the first end portion 32*f* therebetween, and a cover plate 76 that covers a separation space S1 between the bracket side plates 75. Each of the bracket side plates 75 includes a thinned portion 77. The cover plate 76 includes lid pieces 83 that cover the respective thinned portions 77.

According to this configuration, the cylinder bracket 73 can be reduced in weight due to the thinned portions 77 provided in the bracket side plates 75, and therefore mobility of the working device 4 improves. Furthermore, entry of a foreign substance such as dirt or dust from the thinned portions 77 into the separation space S1 between the bracket side plates 75 can be prevented or reduced by the cover plate 76, and therefore stability of operation of the working device 4 improves.

Although the present invention has been described above, the embodiment disclosed herein is illustrative in all respects and should not be construed as being restrictive. The scope of the present invention is indicated not by the above description but by the claims, and is intended to encompass all changes within meaning and range equivalent to the claims.

Although an example in which the present invention is applied to a working machine such as a backhoe has been described in the above embodiment, a target to which the present invention is applied is not limited to this, and the present invention may be applied to other construction machines such as a wheel loader, a compact track loader, and a skid-steer loader or may be applied to agricultural machines such as a tractor, a combine, a rice planter, and a lawn mower.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A cylinder cover to be mounted on a hydraulic cylinder and protect a cylinder rod of the hydraulic cylinder, the cylinder cover comprising:

a cover body that includes a first end attached to a head side portion of the cylinder rod and moves together with the cylinder rod according to a telescopic movement of the hydraulic cylinder; and a guide portion to support the cover body such that the cover body is slidable along an extension direction of the cylinder rod, wherein the guide portion includes:

a guide plate that is provided on an outer circumferential portion of a cylinder tube of the hydraulic cylinder so as to extend in a direction of tangent to an outer circumference of a cross section of the cylinder tube that is perpendicular to an extension direction of the cylinder tube; and a pair of end portions that are provided on both end portions of the guide plate in the direction of tangent, the cover body includes:

first portions that face first side surfaces of the end portions that are located opposite to the cylinder tube;

second portions that face end surfaces of the end portions in the direction of tangent; and third portions that face second side surfaces of the end portions that are close to the cylinder tube, each of the end portions includes, on the end surface thereof, a first curved convex surface portion curved such as to bulge toward the second portion, the first curved convex surface portion, when viewed from a direction normal to a plate surface of the guide plate, has an arc shape that defines a part of a circle having a diameter smaller than a circle whose diameter is a width by which the second portions provided on both sides of the cover body in the direction of tangent are separated, and the first curved convex surface portions of the end portions provided on both sides in the direction of tangent have concentric arc shapes.

2. The cylinder cover according to claim 1, wherein each of the end surfaces includes, on both sides of the first curved convex surface portion in the extension direction of the cylinder rod, an inclined surface portion inclined farther away from the second portion as a distance from the first curved convex surface portion increases in the extension direction of the cylinder rod.

3. The cylinder cover according to claim 1, wherein a cross section of each of the end surfaces that is perpendicular to the extension direction of the cylinder rod has a shape curved such as to bulge toward the second portion or a corner portion of each of the end surfaces that is located opposite to the cylinder tube and a corner portion of each of the end surfaces that is close to the cylinder tube on the cross section perpendicular to the extension direction of the cylinder rod are chamfered.

4. The cylinder cover according to claim 1, wherein each of the end portions includes, on at least one of the first side surface and the second side surface, a second curved convex surface portion curved such as to bulge in a direction normal to a plate surface of the guide plate.

5. The cylinder cover according to claim 4, wherein a cross section of the second curved convex surface portion that is perpendicular to the extension direction of the cylinder rod has an arc shape.

6. A cylinder cover to be mounted on a hydraulic cylinder and protect a cylinder rod of the hydraulic cylinder, the cylinder cover comprising:

a cover body that includes a first end attached to a head side portion of the cylinder rod and moves together with the cylinder rod according to a telescopic movement of the hydraulic cylinder; and a guide portion to support the cover body such that the cover body is slidable along an extension direction of the cylinder rod, wherein the guide portion includes:

a guide plate that is provided on an outer circumferential portion of a cylinder tube of the hydraulic cylinder so as to extend in a direction of tangent to an outer circumference of a cross section of the cylinder tube that is perpendicular to an extension direction of the cylinder tube; and a pair of end portions that are provided on both end portions of the guide plate in the direction of tangent, the cover body includes:

first portions that face first side surfaces of the end portions that are located opposite to the cylinder tube;

second portions that face end surfaces of the end portions in the direction of tangent; and third portions that face second side surfaces of the end portions that are close to the cylinder tube, and each of the end portions is made of a resin member and includes, on the end surface thereof, a first curved convex surface portion curved such as to bulge toward the second portion.

7. A working machine comprising:

a machine body; and a working device mounted on the machine body, wherein the working device includes:

the hydraulic cylinder on which the cylinder cover, according to claim 6, is mounted; and a cylinder bracket that supports a first end portion on a head side portion of the cylinder rod, the cylinder bracket includes a pair of bracket side plates that stand away from each other in one direction and sandwich the first end portion and a cover plate that covers a separation space between the bracket side plates, each of the bracket side plates includes a thinned portion, and the cover plate includes lid pieces that cover the respective thinned portions.

8. The working machine according to claim 7, wherein the lid pieces are formed by bending portions of the cover plate.

9. The working machine according to claim 7, wherein the first end of the cylinder cover is attached to the head side portion of the cylinder rod from a first direction with use of a bolt, and the cover plate is provided at a position that does not overlap an attachment portion of the bolt when viewed from the first direction.

10. The working machine according to claim 7, wherein the thinned portion is a cutout formed in a head edge portion of each of the bracket side plates.

11. A working machine comprising:

a machine body; and a working device mounted on the machine body, wherein the working device includes a hydraulic cylinder that drives the working device and a cylinder bracket that supports a first end portion of the hydraulic cylinder, the cylinder bracket includes:

a pair of bracket side plates that stand away from each other in one direction and sandwich the first end portion therebetween; and a cover plate that covers a separation space between the bracket side plates, each of the bracket side plates includes a thinned portion; and the cover plate includes lid pieces that cover the respective thinned portions.

* * * * *